US010706569B2

(12) United States Patent
Harris et al.

(10) Patent No.: US 10,706,569 B2
(45) Date of Patent: Jul. 7, 2020

(54) SELECTIVELY PAIRED IMAGING ELEMENTS FOR STEREO IMAGES

(71) Applicant: Amazon Technologies, Inc., Seattle, WA (US)

(72) Inventors: Scott Raymond Harris, Bainbridge Island, WA (US); Barry James O'Brien, Seattle, WA (US); Joshua John Watson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 251 days.

(21) Appl. No.: 15/176,734

(22) Filed: Jun. 8, 2016

(65) Prior Publication Data
US 2017/0358099 A1 Dec. 14, 2017

(51) Int. Cl.
*G06T 7/55* (2017.01)
*G06T 7/62* (2017.01)
(Continued)

(52) U.S. Cl.
CPC ............... *G06T 7/55* (2017.01); *G06T 7/596* (2017.01); *G06T 7/62* (2017.01); *H04N 7/185* (2013.01);
(Continued)

(58) Field of Classification Search
CPC .............. G06T 7/55; G06T 7/62; H04N 7/185
(Continued)

(56) References Cited

U.S. PATENT DOCUMENTS

| 4,805,015 A * | 2/1989 | Copeland ................ G01S 13/89 348/48 |
| 8,643,724 B2 * | 2/2014 | Schofield ................. B60R 1/00 348/148 |

(Continued)

FOREIGN PATENT DOCUMENTS

WO     2016086379 A1    6/2016

OTHER PUBLICATIONS

Dominik Honegger et al. "Embedded Real-time Multi-Baseline Stereo", 2017 IEEE International Conference on Robotics and Automation (ICRA), Mar. 8, 2017 (Mar. 8, 2017), XP055393231.
(Continued)

*Primary Examiner* — Jefferey F Harold
*Assistant Examiner* — Humam M Satti
(74) *Attorney, Agent, or Firm* — Athorus, PLLC (57) ABSTRACT

This disclosure describes a configuration of an aerial vehicle, such as an unmanned aerial vehicle ("UAV"), that includes a plurality of cameras that may be selectively combined to form a stereo pair for use in obtaining stereo images that provide depth information corresponding to objects represented in those images. Depending on the distance between an object and the aerial vehicle, different cameras may be selected for the stereo pair based on the baseline between those cameras and a distance between the object and the aerial vehicle. For example, cameras with a small baseline (close together) may be selected to generate stereo images and depth information for an object that is close to the aerial vehicle. In comparison, cameras with a large baseline may be selected to generate stereo images and depth information for an object that is farther away from the aerial vehicle.

22 Claims, 7 Drawing Sheets

(51) Int. Cl.
*H04N 7/18* (2006.01)
*G06T 7/593* (2017.01)

(52) U.S. Cl.
CPC .............. *G06T 2207/10012* (2013.01); *G06T 2207/10032* (2013.01); *G06T 2207/30181* (2013.01)

(58) Field of Classification Search
USPC .......................................................... 348/144
See application file for complete search history.

(56) References Cited

U.S. PATENT DOCUMENTS

| | | | | |
|---|---|---|---|---|
| 2012/0188420 A1* | 7/2012 | Black | ................... | H04N 5/2253 348/279 |
| 2012/0307017 A1* | 12/2012 | Lievens | ............... | H04N 13/243 348/47 |
| 2015/0163478 A1* | 6/2015 | Geiss | .................. | H04N 13/243 348/47 |
| 2015/0292873 A1* | 10/2015 | Chou | .................. | G01B 11/254 348/136 |
| 2016/0008988 A1* | 1/2016 | Kennedy | .................... | B25J 9/06 414/738 |
| 2016/0198144 A1* | 7/2016 | Yu | ........................ | H04N 13/243 348/48 |
| 2016/0301916 A1* | 10/2016 | Zhang | ........................ | G06T 7/73 |
| 2017/0177937 A1* | 6/2017 | Harmsen | ................. | G06T 7/579 |
| 2017/0289525 A1* | 10/2017 | Wivell | ................. | G03B 17/561 |
| 2017/0337703 A1* | 11/2017 | Wu | ........................... | G06T 7/11 |
| 2018/0053427 A1* | 2/2018 | Cherepinsky | ........ | G05D 1/0669 |

OTHER PUBLICATIONS

Gohl Pascal et al: "Omnidirectional visual obstacle detection using embedded FPGA", 2015 IEEE/RJS International Conference on Intelligent Robots and Systems (IROS), IEEE, Sep. 28, 2015 (Sep. 28, 2015), pp. 3938-3943, XP032832152, DOI: 10.1109/IROS.2015.7353931.

International Search Report and Written Opinion for PCT Application No. PCT/US2017/036223 dated Sep. 4, 2017.

Kim Jin Hyo et al. "Multi-UAV-based stereo vision system without GPS for ground obstacle mapping to assist path planning of UGV", Electronics Let, IEE Stevenage, GB, vol. 50, No. 20, Sep. 25, 2014 (Sep. 25, 2014), pp. 1431-1432, XP006049487, ISSN: 0013-5194, DOI: 10.1049/EL.2014.2227.

Nieuwenhuisen Matthias et al: "Multimodal obstacle detection and collision avoidance for micro aerial vehicles", 2013 European Conference on Mobile Robots, IEEE, Sep. 25, 2013 (Sep. 25, 2013), pp. 7-12, XP032548172, DOI: 10.1109/ECMR.2013-12-30.

* cited by examiner

SELECTIVELY PAIRED IMAGING ELEMENTS FOR STEREO IMAGES

BACKGROUND

A digital image is a collection of pixels, typically arranged in an array, which defines an optically formed reproduction of one or more objects, backgrounds or other features of a scene. In a digital image, each of the pixels represents or identifies a color or other light condition associated with a portion of such objects, backgrounds or features. For example, a black-and-white digital image includes a single bit for representing a light condition of the pixel in a binary fashion (e.g., either black or white), while a grayscale digital image may represent the light condition in multiple bits (e.g., two to eight bits for defining tones of gray in terms of percentages or shares of black-and-white), and a color digital image may include groups of bits corresponding to each of a plurality of base colors (e.g., red, green or blue), and the groups of bits may collectively represent a color associated with the pixel. One common digital image is a twenty-four bit (24-bit) color digital image, in which each of the pixels includes three channels of eight bits each, including a first channel of eight bits for describing an extent of red within a pixel, a second channel of eight bits for describing an extent of green within the pixel, and a third channel of eight bits for describing an extent of blue within the pixel.

A depth image, or depth map is also a collection of pixels that defines an optically formed reproduction of one or more objects, backgrounds or other features of a scene. Unlike the pixels of a digital image, however, each of the pixels of a depth image represents or identifies not a light condition or color of such objects, backgrounds or features, but a distance to objects, backgrounds or features. For example, a pixel of a depth image may represent a distance between a sensor of an imaging device that captured the depth image (e.g., a depth camera or range sensor) and the respective object, background or feature to which the pixel corresponds.

A depth image or depth map can be determined by comparing two or more digital images that are obtained by cameras that are separated by a known baseline to determine a disparity between correlated pixels of the two or more digital images. The resolution of information for objects represented in the images is often dependent on the distance between the cameras and the object and the baseline distance between the two cameras.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to." Additionally, as used herein, the term "coupled" may refer to two or more components connected together, whether that connection is permanent (e.g., welded) or temporary (e.g., bolted), direct or indirect (i.e., through an intermediary), mechanical, chemical, optical, or electrical. Furthermore, as used herein, "horizontal" flight refers to flight traveling in a direction substantially parallel to the ground (i.e., sea level), and that "vertical" flight refers to flight traveling substantially radially outward from the earth's center. It should be understood by those having ordinary skill that trajectories may include components of both "horizontal" and "vertical" flight vectors.

DETAILED DESCRIPTION

This disclosure describes a configuration of an aerial vehicle, such as an unmanned aerial vehicle ("UAV"), that includes a plurality of cameras that may be selectively combined to form a stereo pair for use in obtaining images that may be processed together to provide depth information corresponding to objects represented in those images. Depending on the distance between an object and the aerial vehicle, different combinations of cameras may be selected for the stereo pair based on a baseline distance between those cameras. For example, cameras with a small baseline distance (close together) may be selected to generate images that are compared to determine depth information for an object that is close to the aerial vehicle. In comparison, cameras with a large baseline distance may be selected to generate images that are compared to determine depth information for an object that is farther away from the aerial vehicle.

Figure 1:
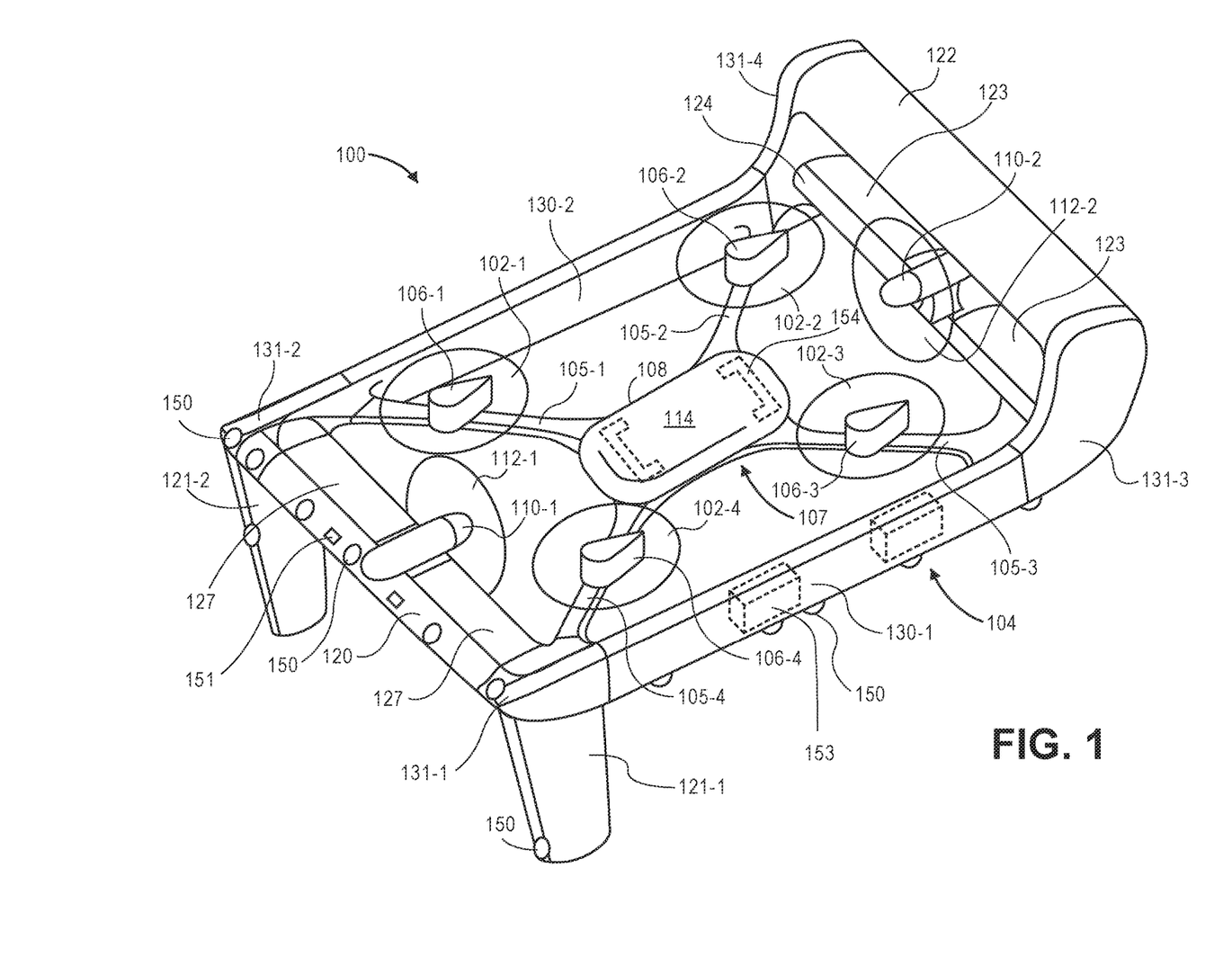
FIG. 1 depicts a view of an unmanned aerial vehicle configuration, according to an implementation.

FIG. 1 illustrates a view of an aerial vehicle, in this instance a UAV 100, according to an implementation. As illustrated, the UAV 100 includes a perimeter frame 104 that includes a front wing 120, a lower rear wing 124, an upper rear wing 122, and two horizontal side rails 130-1, 130-2. The horizontal side rails 130 are coupled to opposing ends of the front wing 120 and opposing ends of the upper rear wing 122 and lower rear wing 124. In some implementations, the coupling may be with a corner junction, such as the front left corner junction 131-1, the front right corner junction 131-2, the rear left corner junction 131-3, and the rear right corner junction 131-4. In such an example, the corner junctions are also part of the perimeter frame 104.

The components of the perimeter frame 104, such as the front wing 120, lower rear wing 124, upper rear wing 122, side rails 130-1, 130-2, and corner junctions 131 may be formed of any one or more suitable materials, such as graphite, carbon fiber, aluminum, titanium, etc., or any combination thereof. In the illustrated example, the components of the perimeter frame 104 of the UAV 100 are each formed of carbon fiber and joined at the corners using corner junctions 131. The components of the perimeter frame 104 may be coupled using a variety of techniques. For example, if the components of the perimeter frame 104 are carbon fiber, they may be fitted together and joined using secondary bonding, a technique known to those of skill in the art. In other implementations, the components of the perimeter frame 104 may be affixed with one or more attachment mechanisms, such as screws, rivets, latches, quarter-turn fasteners, etc., or otherwise secured together in a permanent or removable manner.

The front wing 120, lower rear wing 124, and upper rear wing 122 are positioned in a tri-wing configuration and each wing provides lift to the UAV 100 when the UAV is moving in a direction that includes a horizontal component. For example, the wings may each have an airfoil shape that causes lift due to the airflow passing over the wings during horizontal flight.

Opposing ends of the front wing 120 may be coupled to a corner junction 131, such as the front left corner junction 131-1 and front right corner junction 131-2. In some implementations, the front wing may include one or more flaps 127 or ailerons, that may be used to adjust the pitch, yaw and/or roll of the UAV 100 alone or in combination with the lifting motors 106, lifting propellers 102, thrusting motors 110, thrusting propellers 112, and/or other flaps on the rear wings, discussed below. In some implementations, the flaps 127 may also be used as a protective shroud to further hinder access to the lifting propellers 102 by objects external to the UAV 100. For example, when the UAV 100 is moving in a vertical direction or hovering, the flaps 127 may be extended to increase the height of the protective barrier around a portion of the lifting propellers 102.

In some implementations, the front wing 120 may include two or more pairs of flaps 127, as illustrated in FIG. 1. In other implementations, for example if there is no front thrusting motor 110-1, the front wing 120 may only include a single flap 127 that extends substantially the length of the front wing 120. If the front wing 120 does not include flaps 127, the lifting motors 106 and lifting propellers 102, thrusting motors 110, thrusting propellers 112 and/or flaps of the rear wings may be utilized to control the pitch, yaw, and/or roll of the UAV 100 during flight.

Opposing ends of the lower rear wing 124 may be coupled to a corner junction 131, such as the rear left corner junction 131-3 and rear right corner junction 131-4. In some implementations, the lower rear wing may include one or more flaps 123 or ailerons, that may be used to adjust the pitch, yaw and/or roll of the UAV 100 alone or in combination with the lifting motors 106, lifting propellers 102, thrusting motors 110, thrusting propellers 112, and/or the flaps 127 of the front wing. In some implementations, the flaps 123 may also be used as a protective shroud to further hinder access to the lifting propellers 102 by objects external to the UAV 100. For example, when the UAV 100 is moving in a vertical direction or hovering, the flaps 123 may be extended, similar to the extending of the front flaps 127 of the front wing 120.

In some implementations, the rear wing 124 may include two or more flaps 123, as illustrated in FIG. 1 or two or more pairs of flaps, respectively. In other implementations, for example if there is no rear thrusting motor 110-2 mounted to the lower rear wing, the rear wing 124 may only include a single flap 123 that extends substantially the length of the lower rear wing 124. In other implementations, if the lower rear wing includes two thrusting motors, the lower rear wing may be configured to include three flaps 123, one on either end of the lower rear wing 124, and one between the two thrusting motors mounted to the lower rear wing 124.

Opposing ends of the upper rear wing 122 may be coupled to a corner junction 131, such as the rear left corner junction 131-3 and rear right corner junction 131-4. In some implementations, like the lower rear wing, the upper rear wing 122 may include one or more flaps (not shown) or ailerons, that may be used to adjust the pitch, yaw and/or roll of the UAV 100 alone or in combination with the lifting motors 106, lifting propellers 102, thrusting motors 110, thrusting propellers 112, and/or other flaps of other wings. In some implementations, the flaps may also be used as a protective shroud to further hinder access to the lifting propellers 102 by objects external to the UAV 100. For example, when the UAV 100 is moving in a vertical direction or hovering, the flaps may be extended, similar to the extending of the front flaps 127 of the front wing 120 or the flaps 123 of the lower rear wing.

The front wing 120, lower rear wing 124, and upper rear wing 122 may be positioned and sized proportionally to provide stability to the UAV while the UAV 100 is moving in a direction that includes a horizontal component. For example, the lower rear wing 124 and the upper rear wing 122 are stacked vertically such that the vertical lift vectors generated by each of the lower rear wing 124 and upper rear wing 122 are close together, which may be destabilizing during horizontal flight. In comparison, the front wing 120 is separated from the rear wings longitudinally such that the vertical lift vector generated by the front wing 120 acts together with the vertical lift vectors of the lower rear wing 124 and the upper rear wing 122, providing efficiency, stabilization and control.

In some implementations, to further increase the stability and control of the UAV 100, one or more winglets 121, or stabilizer arms, may also be coupled to and included as part of the perimeter frame 104. In the example illustrated with respect to FIG. 1, there are two front winglets 121-1 and 121-2 mounted to the underneath side of the front left corner junction 131-1 and the front right corner junction 131-2, respectively. The winglets 121 extend in a downward direction approximately perpendicular to the front wing 120 and side rails 130. Likewise, the two rear corner junctions 131-3, 131-4 are also formed and operate as winglets providing additional stability and control to the UAV 100 when the UAV 100 is moving in a direction that includes a horizontal component.

The winglets 121 and the rear corner junctions 131 may have dimensions that are proportional to the length, width, and height of the UAV 100 and may be positioned based on the approximate center of gravity of the UAV 100 to provide stability and control to the UAV 100 during horizontal flight. For example, in one implementation, the UAV 100 may be approximately 64.75 inches long from the front of the UAV 100 to the rear of the UAV 100 and approximately 60.00 inches wide. In such a configuration, the front wing 120 has dimensions of approximately 60.00 inches by approximately 7.87 inches. The lower rear wing 124 has dimensions of approximately 60.00 inches by approximately 9.14 inches. The upper rear wing 122 has dimensions of approximately 60.00 inches by approximately 5.47 inches. The vertical separation between the lower rear wing and the upper rear wing is approximately 21.65 inches. The winglets 121 are approximately 6.40 inches wide at the corner junction with the perimeter frame of the UAV, approximately 5.91 inches wide at the opposing end of the winglet and approximately 23.62 inches long. The rear corner junctions 131-3, 131-4 are approximately 9.14 inches wide at the end that couples with the lower rear wing 124, approximately 8.04 inches wide at the opposing end, and approximately 21.65 inches long. The overall weight of the UAV 100 is approximately 50.00 pounds.

Coupled to the interior of the perimeter frame 104 is a central frame 107. The central frame 107 includes a hub 108 and motor arms 105 that extend from the hub 108 and couple to the interior of the perimeter frame 104. In this example, there is a single hub 108 and four motor arms 105-1, 105-2, 105-3, and 105-4. Each of the motor arms 105 extend from approximately a corner of the hub 108 and couple or terminate into a respective interior corner of the perimeter frame. In some implementations, each motor arm 105 may couple into a corner junction 131 of the perimeter frame 104. Like the perimeter frame 104, the central frame 107 may be formed of any suitable material, such as graphite, carbon fiber, aluminum, titanium, etc., or any combination thereof. In this example, the central frame 107 is formed of carbon fiber and joined at the corners of the perimeter frame 104 at the corner junctions 131. Joining of the central frame 107 to the perimeter frame 104 may be done using any one or more of the techniques discussed above for joining the components of the perimeter frame 104.

Lifting motors 106 are coupled at approximately a center of each motor arm 105 so that the lifting motor 106 and corresponding lifting propeller 102 are within the substantially rectangular shape of the perimeter frame 104. In one implementation, the lifting motors 106 are mounted to an underneath or bottom side of each motor arm 105 in a downward direction so that the propeller shaft of the lifting motor that mounts to the lifting propeller 102 is facing downward. In other implementations, as illustrated in FIG. 1, the lifting motors 106 may be mounted to a top of the motor arms 105 in an upward direction so that the propeller shaft of the lifting motor that mounts to the lifting propeller 102 is facing upward. In this example, there are four lifting motors 106-1, 106-2, 106-3, 106-4, each mounted to an upper side of a respective motor arm 105-1, 105-2, 105-3, and 105-4.

In some implementations, multiple lifting motors may be coupled to each motor arm 105. For example, while FIG. 1 illustrates a quad-copter configuration with each lifting motor mounted to a top of each motor arm, a similar configuration may be utilized for an octo-copter. For example, in addition to mounting a motor 106 to an upper side of each motor arm 105, another lifting motor may also be mounted to an underneath side of each motor arm 105 and oriented in a downward direction. In another implementation, the central frame may have a different configuration, such as additional motor arms. For example, eight motor arms may extend in different directions and a lifting motor may be mounted to each motor arm.

The lifting motors may be any form of motor capable of generating enough rotational speed with the lifting propellers 102 to lift the UAV 100 and any engaged payload, thereby enabling aerial transport of the payload.

Mounted to each lifting motor 106 is a lifting propeller 102. The lifting propellers 102 may be any form of propeller (e.g., graphite, carbon fiber) and of a size sufficient to lift the UAV 100 and any payload engaged by the UAV 100 so that the UAV 100 can navigate through the air, for example, to deliver a payload to a delivery location. For example, the lifting propellers 102 may each be carbon fiber propellers having a dimension or diameter of twenty-four inches. While the illustration of FIG. 1 shows the lifting propellers 102 all of a same size, in some implementations, one or more of the lifting propellers 102 may be different sizes and/or dimensions. Likewise, while this example includes four lifting propellers 102-1, 102-2, 102-3, 102-4, in other implementations, more or fewer propellers may be utilized as lifting propellers 102. Likewise, in some implementations, the lifting propellers 102 may be positioned at different locations on the UAV 100. In addition, alternative methods of propulsion may be utilized as "motors" in implementations described herein. For example, fans, jets, turbojets, turbo fans, jet engines, internal combustion engines, and the like may be used (either with propellers or other devices) to provide lift for the UAV.

In addition to the lifting motors 106 and lifting propellers 102, the UAV 100 may also include one or more thrusting motors 110 and corresponding thrusting propellers 112. The thrusting motors and thrusting propellers may be the same or different than the lifting motors 106 and lifting propellers 102. For example, in some implementations, the thrusting propellers may be formed of carbon fiber and be approximately eighteen inches long. In other implementations, the thrusting motors may utilize other forms of propulsion to propel the UAV. For example, fans, jets, turbojets, turbo fans, jet engines, internal combustion engines, and the like may be used (either with propellers or with other devices) as the thrusting motors.

The thrusting motors and thrusting propellers may be oriented at approximately ninety degrees with respect to the perimeter frame 104 and central frame 107 of the UAV 100 and utilized to increase the efficiency of flight that includes a horizontal component. For example, when the UAV 100 is traveling in a direction that includes a horizontal component, the thrusting motors may be engaged to provide a horizontal thrust force via the thrusting propellers to propel the UAV 100 horizontally. As a result, the speed and power utilized by the lifting motors 106 may be reduced. Alternatively, in selected implementations, the thrusting motors may be oriented at an angle greater or less than ninety degrees with respect to the perimeter frame 104 and the central frame 107 to provide a combination of thrust and lift.

In the example illustrated in FIG. 1, the UAV 100 includes two thrusting motors 110-1, 110-2 and corresponding thrusting propellers 112-1, 112-2. Specifically, in the illustrated example, there is a front thrusting motor 110-1 coupled to and positioned near an approximate mid-point of the front wing 120. The front thrusting motor 110-1 is oriented such that the corresponding thrusting propeller 112-1 is positioned inside the perimeter frame 104. The second thrusting motor is coupled to and positioned near an approximate mid-point of the lower rear wing 124. The rear thrusting motor 110-2 is oriented such that the corresponding thrusting propeller 112-2 is positioned inside the perimeter frame 104.

While the example illustrated in FIG. 1 illustrates the UAV with two thrusting motors 110 and corresponding thrusting propellers 112, in other implementations, there may be fewer or additional thrusting motors and corresponding thrusting propellers. For example, in some implementations, the UAV 100 may only include a single rear thrusting motor 110 and corresponding thrusting propeller 112. In another implementation, there may be two thrusting motors and corresponding thrusting propellers mounted to the lower rear wing 124. In such a configuration, the front thrusting motor 110-1 may be included or omitted from the UAV 100. Likewise, while the example illustrated in FIG. 1 shows the thrusting motors oriented to position the thrusting propellers inside the perimeter frame 104, in other implementations, one or more of the thrusting motors 110 may be oriented such that the corresponding thrusting propeller 112 is oriented outside of the protective frame 104.

The perimeter frame 104 provides safety for objects foreign to the UAV 100 by inhibiting access to the lifting propellers 102 from the side of the UAV 100, provides protection to the UAV 100, and increases the structural integrity of the UAV 100. For example, if the UAV 100 is traveling horizontally and collides with a foreign object (e.g., wall, building), the impact between the UAV 100 and the foreign object will be with the perimeter frame 104, rather than a propeller. Likewise, because the frame is interconnected with the central frame 107, the forces from the impact are dissipated across both the perimeter frame 104 and the central frame 107.

The perimeter frame 104 also provides a surface upon which one or more components of the UAV 100 may be mounted. Alternatively, or in addition thereto, one or more components of the UAV may be mounted or positioned within the cavity of the portions of the perimeter frame 104. For example, one or more antennas may be mounted on or in the front wing 120. The antennas may be used to transmit and/or receive wireless communications. For example, the antennas may be utilized for Wi-Fi, satellite, near field communication ("NFC"), cellular communication, or any other form of wireless communication. Other components, such as imaging elements (e.g., cameras), time of flight sensors, accelerometers, inclinometers, distance-determining elements, gimbals, Global Positioning System (GPS) receiver/transmitter, radars, illumination elements, speakers, and/or any other component of the UAV 100 or the aerial vehicle control system (discussed below), etc., may likewise be mounted to or in the perimeter frame 104. Likewise, identification or reflective identifiers may be mounted to the perimeter frame 104 to aid in the identification of the UAV 100.

In some implementations, as discussed below, multiple imaging elements 150, such as digital still cameras, red, green, blue (RGB) cameras, video cameras, thermographic cameras, etc., may be mounted to and spaced about the frame of the UAV 100. Likewise, one or more distance determining elements 151 may be coupled to the frame of the aerial vehicle. Any type of distance determining element may be utilized, including, but not limited to, a time-of-flight sensor, range finder, SONAR, LIDAR, etc.

The imaging elements 150 may be arranged such that at least a portion of the field of view of multiple imaging elements overlap. As discussed further below, the imaging elements 150 may communicate with and be controlled by an imaging element selection controller that dynamically selects two or more imaging elements as a stereo pair or imaging element pair. The selected combination of imaging elements is used to obtain images of objects in the common field of view for those selected imaging elements and the obtained images are processed to generate depth information, such as disparity and displacement, for objects represented in the common field of view.

As illustrated, the imaging elements 150 may be affixed to any portion of the frame of the UAV 100. For example, a first group of imaging elements 150 may be arranged along the front of the front wing 120 and oriented such that the field of view of those imaging elements at least partially overlap (i.e., are common). As another example, a second group of imaging elements 150 may be arranged along the underneath or lower side of the side rail 130-1 and oriented such that the field of view of those imaging elements is at least partially common. As will be appreciated, any number of imaging elements may be included in a group or set of imaging elements with overlapping fields of view and any number of sets of imaging elements may be arranged along the UAV 100. The imaging elements of each set of imaging elements 150 may be controlled by one or more imaging element selection controllers, as discussed further below.

In some implementations, the perimeter frame 104 may also include a permeable material (e.g., mesh, screen) that extends over the top and/or lower surface of the perimeter frame 104 enclosing the central frame, lifting motors, and/or lifting propellers.

An aerial vehicle control system 114 is also mounted to the central frame 107. In this example, the aerial vehicle control system 114 is mounted to the hub 108 and is enclosed in a protective barrier. The protective barrier may provide the control system 114 weather protection so that the UAV 100 may operate in rain and/or snow without disrupting the control system 114. In some implementations, the protective barrier may have an aerodynamic shape to reduce drag when the UAV is moving in a direction that includes a horizontal component. The protective barrier may be formed of any materials including, but not limited to, graphite-epoxy, Kevlar, and/or fiberglass. In some implementations, multiple materials may be utilized. For example, Kevlar may be utilized in areas where signals need to be transmitted and/or received.

Likewise, the UAV 100 includes one or more power modules 153. In some implementations, the power modules 153 may be positioned inside the cavity of the side rails 130-1, 130-2. In other implementations, the power modules 153 may be mounted or positioned at other locations of the UAV. The power modules 153 for the UAV may be in the form of battery power, solar power, gas power, super capacitor, fuel cell, alternative power generation source, or a combination thereof. For example, the power modules 153 may each be a 6000 mAh lithium-ion polymer battery, or polymer lithium ion (Li-poly, Li-Pol, LiPo, LIP, PLI or Lip) battery. The power module(s) are coupled to and provide power for the aerial vehicle control system 114, the lifting motors 106, the thrusting motors 110, the imaging elements 150, and the payload engagement mechanism 154.

In some implementations, one or more of the power modules 153 may be configured such that it can be autonomously removed and/or replaced with another power module while the UAV is landed or in flight. For example, when the UAV lands at a location, the UAV may engage with a charging member at the location that will recharge the power module.

As mentioned above, the UAV 100 may also include a payload engagement mechanism 154. The payload engagement mechanism 154 may be configured to engage and disengage items and/or containers that hold items (payload). In this example, the payload engagement mechanism 154 is positioned beneath and coupled to the hub 108 of the frame 104 of the UAV 100. The payload engagement mechanism 154 may be of any size sufficient to securely engage and disengage a payload. In other implementations, the payload engagement mechanism 154 may operate as the container in which it contains item(s). The payload engagement mechanism 154 communicates with (via wired or wireless communication) and is controlled by the aerial vehicle control system 114. Example payload engagement mechanisms are described in co-pending patent application Ser. No. 14/502, 707, filed Sep. 30, 2014, titled "UNMANNED AERIAL VEHICLE DELIVERY SYSTEM," the subject matter of which is incorporated by reference herein in its entirety.

Figure 2A:
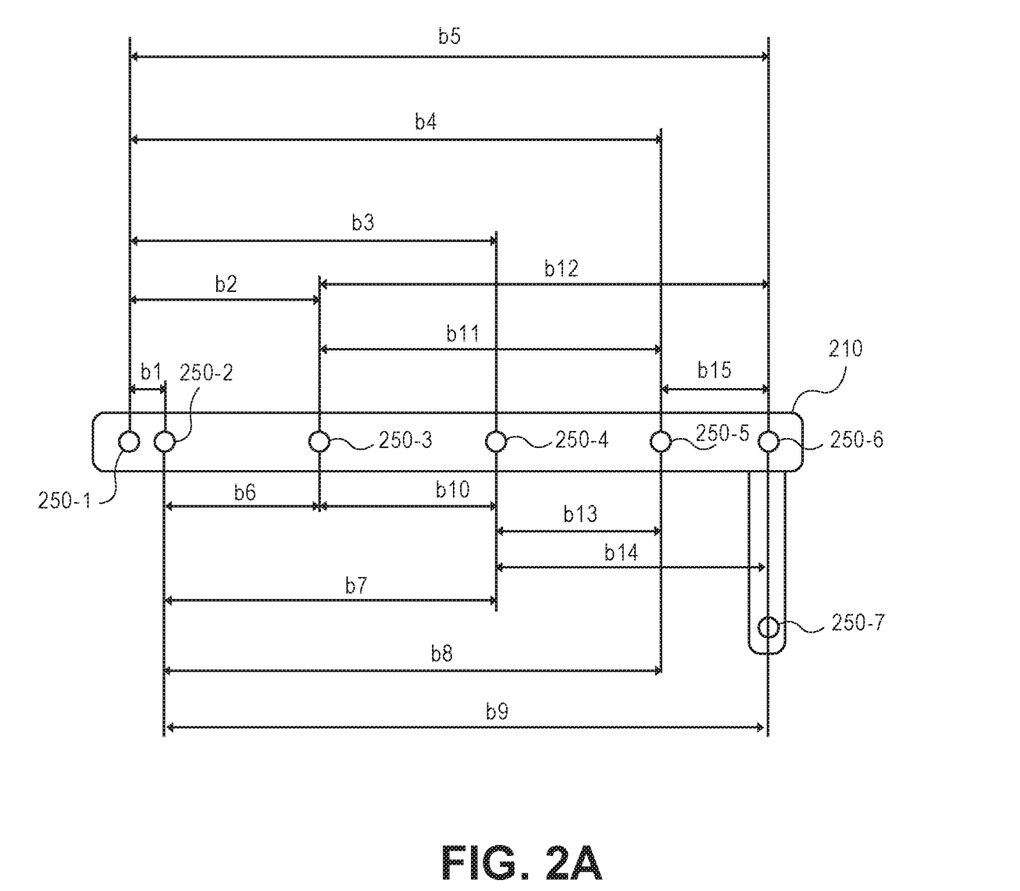
FIGS. 2A and 2B depict a view of a plurality of selectable imaging elements of an aerial vehicle, according to an implementation.
Figure 2B:
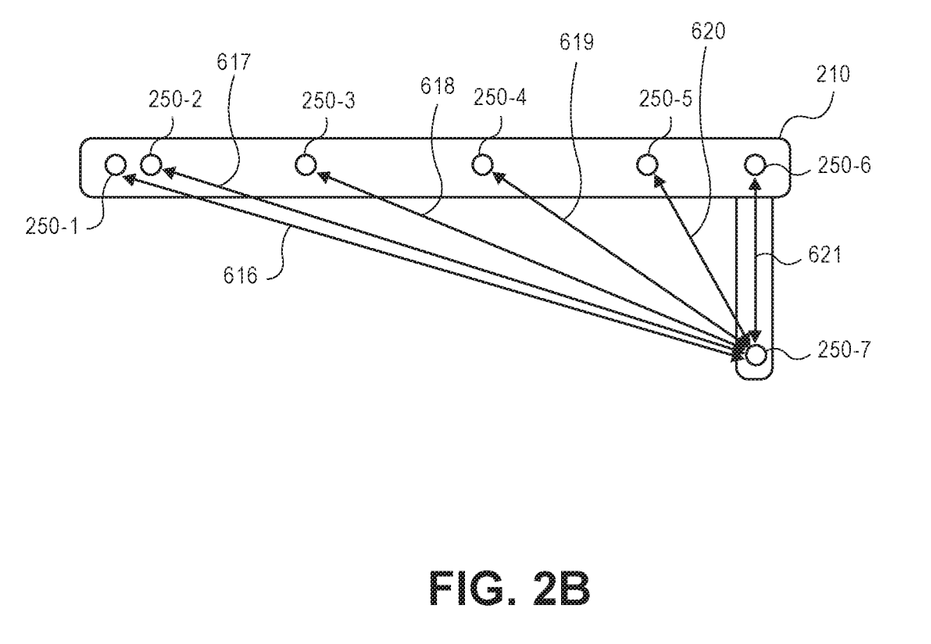

FIGS. 2A and 2B depict a view of a plurality of selectable imaging elements 250, or cameras, of an aerial vehicle, such as a UAV, according to an implementation. In this example, there are seven imaging elements arranged along a portion of a frame 210 of an aerial vehicle. As will be appreciated, any number and arrangement of imaging elements may be utilized with the implementations described herein. Likewise, any spacing configuration may be utilized. The only constraint is that the field of view of each imaging element 250 of the set or plurality of imaging elements at least partially overlap with the field of view of at least one other imaging element of the set. In some implementations, the configuration and spacing of imaging elements 250 may be such that the field of view of each imaging element at least partially overlaps with the field of view of at least two other imaging elements of the plurality of imaging element. In still other implementations, the configuration and spacing may be such that at least a portion of the field of view of each imaging element overlaps with the field of view of each of the other imaging elements of the plurality of imaging elements.

In the illustrated example, the placement and spacing of the imaging elements 250-1, 250-2, 250-3, 250-4, 250-5, 250-6, and 250-7 is such that no two baseline distances ($b_1$, $b_2$, $b_3$, $b_4$, $b_5$, $b_6$, $b_7$, $b_8$, $b_9$, $b_{10}$, $b_{11}$, $b_{12}$, $b_{13}$, $b_{14}$, $b_{15}$, $b_{16}$, $b_{17}$, $b_{18}$, $b_{19}$, $b_{20}$, and $b_{21}$,) are the same. In other configurations, some or all of the baseline distances may be approximately the same distance.

By spacing the imaging elements 250 such that each potential pair of imaging elements have a different baseline, the number of different available baseline distances increases. For example, if all baseline distances are different, the number of available baselines is equal to the binomial coefficient:

$$\binom{n}{k} = \frac{n!}{k!(n-k)!}$$

where n is the quantity of imaging elements and k is the number of imaging elements selected for the combination (e.g., two). In the example illustrated in FIGS. 2A-2B, there are seven imaging elements (n) 250-1, 250-2, 250-3, 250-4, 250-5, 250-6, and 250-7, which, if taken in combinations of two (k), results in twenty-one different combinations. By arranging the position of the imaging elements such that all the baseline distances are different, the imaging element selection controller will have twenty-one different baselines and imaging element combinations from which to choose. Likewise, by providing the ability to switch between combinations of imaging elements, regardless of whether the baseline distances are the same or different, redundancy is increased. For example, if one of the imaging elements becomes inoperable (e.g., damaged), depth information may be obtained from a different combination of imaging elements of the aerial vehicle.

As is known in the art, a smaller baseline is typically preferred and provides better imaging results and depth information for objects that are closer to the imaging elements. Likewise, a larger baseline is typically preferred and provides better imaging results and depth information for objects that are farther from the imaging elements. In some implementations, the imaging element selection controller may utilize a ratio to determine which combination of imaging elements to select to obtain images that are compared to generate depth information for an object that is a distance from the UAV. For example, the imaging element selection controller may utilize a 1:30 ratio to select a combination of imaging elements based on the approximate distance between an object and the UAV. For example, using a 1:30 ratio, if the detected object is approximately 15 meters from the UAV, imaging elements having a baseline closest to 0.5 meters will be selected as the stereo pair of imaging elements. For example, imaging elements 250-2 and 250-4 may be selected if the baseline distance $b_{10}$ is approximately 0.5 meters.

In other implementations, a primary distance, middle distance between the different combinations, or multiple groups of combinations may be monitored to detect objects within a distance from the aerial vehicle. Upon object detection, it may be determined which combination of imaging elements provide the best depth information, such as disparity between pixels of the compared images. In some implementations, distance between the UAV and the object may be estimated over a series of images from different combinations of imaging elements. For example, if an object is represented in a first stereo pair that has a small baseline but not represented in a second stereo pair that has a larger baseline, it can be determined that the object is within a defined distance that is less than distance between the UAV and the common field of view of the second stereo pair. As another example, if the object is represented by a few pixels in a first combination of imaging elements that have a small baseline, but is represented by a much larger quantity of pixels in a second combination of imaging elements that have a large baseline, it can be assumed that the object is farther away from the UAV.

Regardless of the technique used to select a combination of imaging elements, as the distance between the object and the UAV changes, the imaging element selection controller may alter one or both of the imaging elements of the stereo pair. For example, if the object moves closer to the UAV, the imaging element selection controller may select imaging element 250-4 and 250-5 because the baseline distance $b_{13}$ is less than the baseline distance $b_{10}$. The smaller baseline distance $b_{13}$ will provide better disparity information for a closer object. Likewise, if the distance between the object and the UAV continues to decrease, the imaging element selection controller may keep imaging element 250-5 and select imaging element 250-6 as the stereo pair because the baseline distance $b_{15}$ is less than the baseline distance $b_{13}$.

In some implementations, the imaging element selection controller may obtain images and determine depth information from multiple combinations of imaging elements and combine the depth information. For example, depth information generated from images provided by the combination of imaging elements 250-1 and 250-2 may be combined with depth information generated from images provided by the combination of imaging elements 250-3 and 250-6. The different baseline distances provide different levels of resolution for the depth information and the combination of depth information may increase the overall accuracy of the depth information.

In some implementations, if an error or inaccuracy in the depth information is detected from a first combination of imaging elements, a different combination of imaging elements may be selected. For example, images from some combinations of imaging elements may not produce accurate depth information because, for example, the field of view is occluded, affected by light (e.g., sunlight), etc. In such an implementation, a different combination of imaging elements, or different sets of combinations of imaging elements may be selected and used to generate depth information.

In some instances, the angle of the baseline between combinations of imaging elements may also be altered. For example, as illustrated in FIG. 2A, the first six imaging elements 250-1-250-6 are aligned horizontally along the portion 210 of the UAV. As such, the baseline distance between each combination of the imaging elements 250-1-250-6 is has approximately a same angle or alignment. However, as illustrated in FIG. 2B, selecting a combination of imaging elements that includes imaging element 250-7 results in a baseline that extends along a different angle or orientation. For example, the alignment of each of the baseline distances $b_{16}$-$b_{21}$ is different than each other and different than each of the baseline distances $b_1$-$b_{15}$.

As will be appreciated, other forms of selection may be utilized to determine which combination of imaging elements to select for imaging an object and generating depth information. Likewise, in some implementations, the resultant depth information may be analyzed to assess whether the combined results are potentially representative of the object. As still another example, in some implementations, some or all of the imaging elements 250 may obtain images and those images may be stored in a data store of the UAV. The imaging element selection controller may then determine which imaging elements to utilize as a stereo pair and select the stored images obtained by those imaging elements for use in generating depth information.

Figure 3:
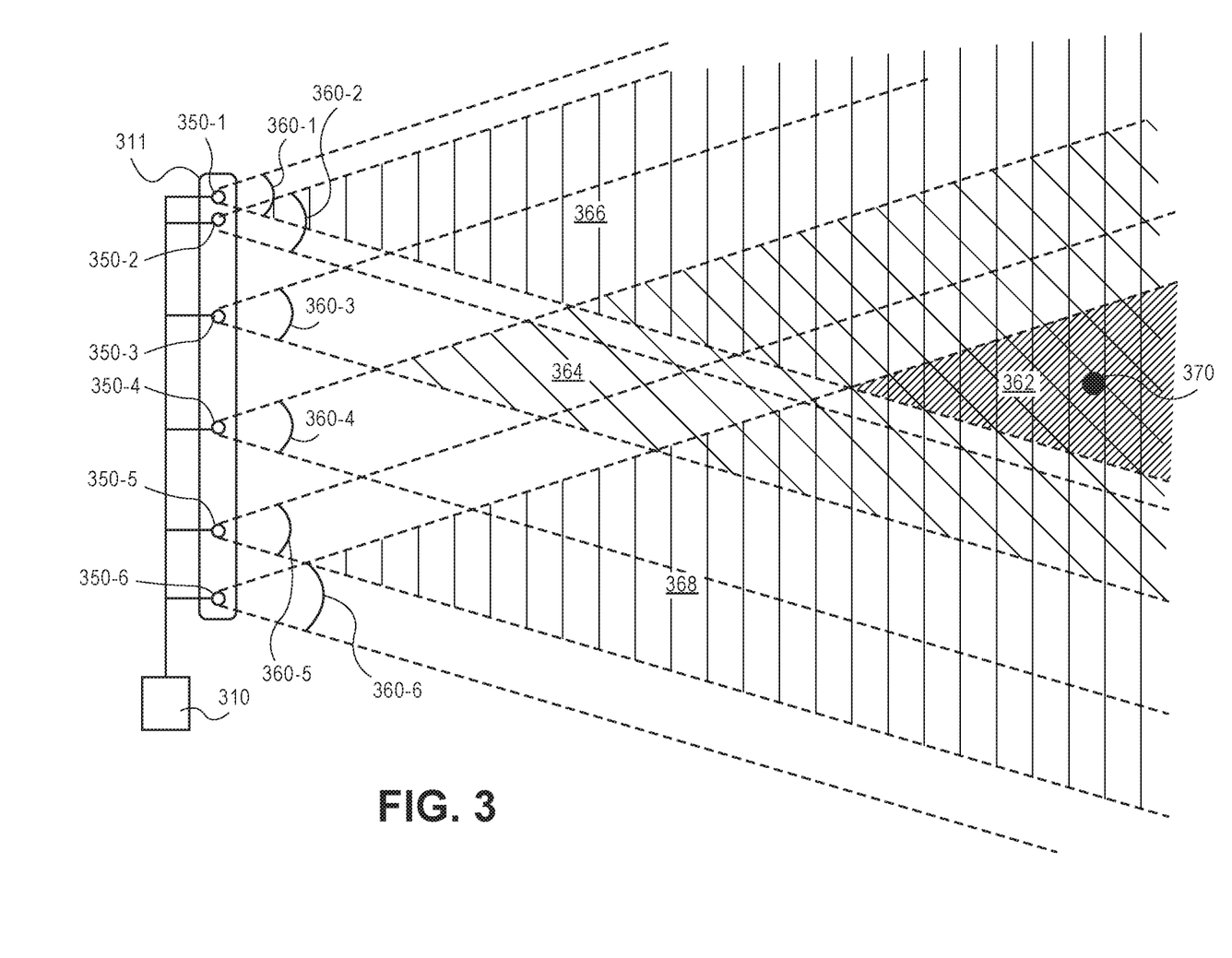
FIG. 3 depicts another view of a plurality of selectable imaging elements of an aerial vehicle, according to an implementation.

FIG. 3 depicts another view of a plurality of selectable imaging elements of an aerial vehicle, according to an implementation. Continuing with the example illustrated in FIG. 2A, FIG. 3 illustrates the six imaging elements 350-1, 350-2, 350-3, 350-4, 350-5, and 350-6 arranged along portion 311 of an aerial vehicle. As illustrated, each of the imaging elements 350 are coupled to, communicate with and are controlled by an imaging element selection controller 310. As illustrated, each of the imaging elements have a field of view 360-1, 360-2, 360-3, 360-4, 360-5, and 360-6. Those fields of view partially overlap forming common fields of view. For example, field of view 360-1 of imaging element 350-1 partially overlaps with field of view 360-2 of imaging element 350-2 to form a common field of view 366. Likewise, field of view 360-5 of imaging element 350-5 partially overlaps with field of view 360-6 of imaging element 350-6 to form common field of view 368.

The imaging element selection controller may determine which imaging elements to activate as a stereo pair of imaging elements. For example, one or more combinations of imaging elements, such as imaging elements 350-1 and 350-2, and/or 350-5 and 350-6 may be used to initially monitor for objects. If an object 370 is detected, an approximate distance between the UAV and the object is determined.

For example, if an object 370 is detected in the common field of view 366 of imaging elements 35-1 and 350-2 but no or limited disparity or other depth information is determinable from a processing of the images generated by each of imaging elements 350-1 and 350-2, it may be determined that the object is at a far distance from the UAV. In such an example, the imaging element selection controller may select another combination of imaging elements, such as imaging elements 350-1 and 350-6 and process images from those imaging elements to determine if depth information for the object is obtainable from the processed images. If depth information still cannot be determined, it may be decided that the object is beyond a distance of potential interest to the UAV. However, if depth information is determined from a processing of images generated by imaging elements 350-1 and 350-2, the object may be monitored and additional depth information obtained.

In some implementations, multiple stereo pairs may be activated by the imaging element selection controller and images from those stereo pairs processed in parallel to determine which combination of imaging elements provides the best resolution of depth information for the detected object. For example, in addition to selecting imaging elements 350-1 and 350-6 as a stereo pair of imaging elements, imaging elements 360-3 and 360-4 may also be activated as a stereo pair of imaging elements. In such an implementation, the depth information generated from images of the two stereo pairs may be combined to provide greater resolution regarding the distance of the object from the aerial vehicle. Likewise, by monitoring the distance of the object with two stereo pairs that have different baseline distances and different common fields of view, if the object moves out of a common field of view of one of the stereo pairs it may remain in the common field of view of the second stereo pair.

For example, the field of view 360-1 of imaging element 350-1 overlaps with the field of view 360-6 of imaging element 350-6, as illustrated by overlapping or common field of view 362. Likewise, the object 370 is positioned in the common field of view 362. In a similar manner, the field of view 360-3 of imaging element 350-3 overlaps with the field of view 360-4 of imaging element 350-4, as illustrated by overlapping or common field of view 364. The object 370 is also positioned in the common field of view 364. If the object, or the UAV, moves such that the object 370 is closer to the UAV, the object 370 may exit the common field of view 362 but remain in the common field of view 364.

When the imaging element selection controller 310 selects a combination of imaging elements and receives or obtains images obtained by those imaging elements, the overlapping portions of those images are aligned based on a pixel relationship that is established when the imaging elements are calibrated, as is known in the art. The alignment of the pixel information and the known baseline information between the selected imaging elements are used to determine depth information for objects represented in both images. In the present implementations, multiple cameras are calibrated as the different potential combinations with the different baselines. The imaging element selection controller may then select the appropriate combination of imaging elements as the stereo pair for obtaining images that are used to form depth information.

Figure 4:
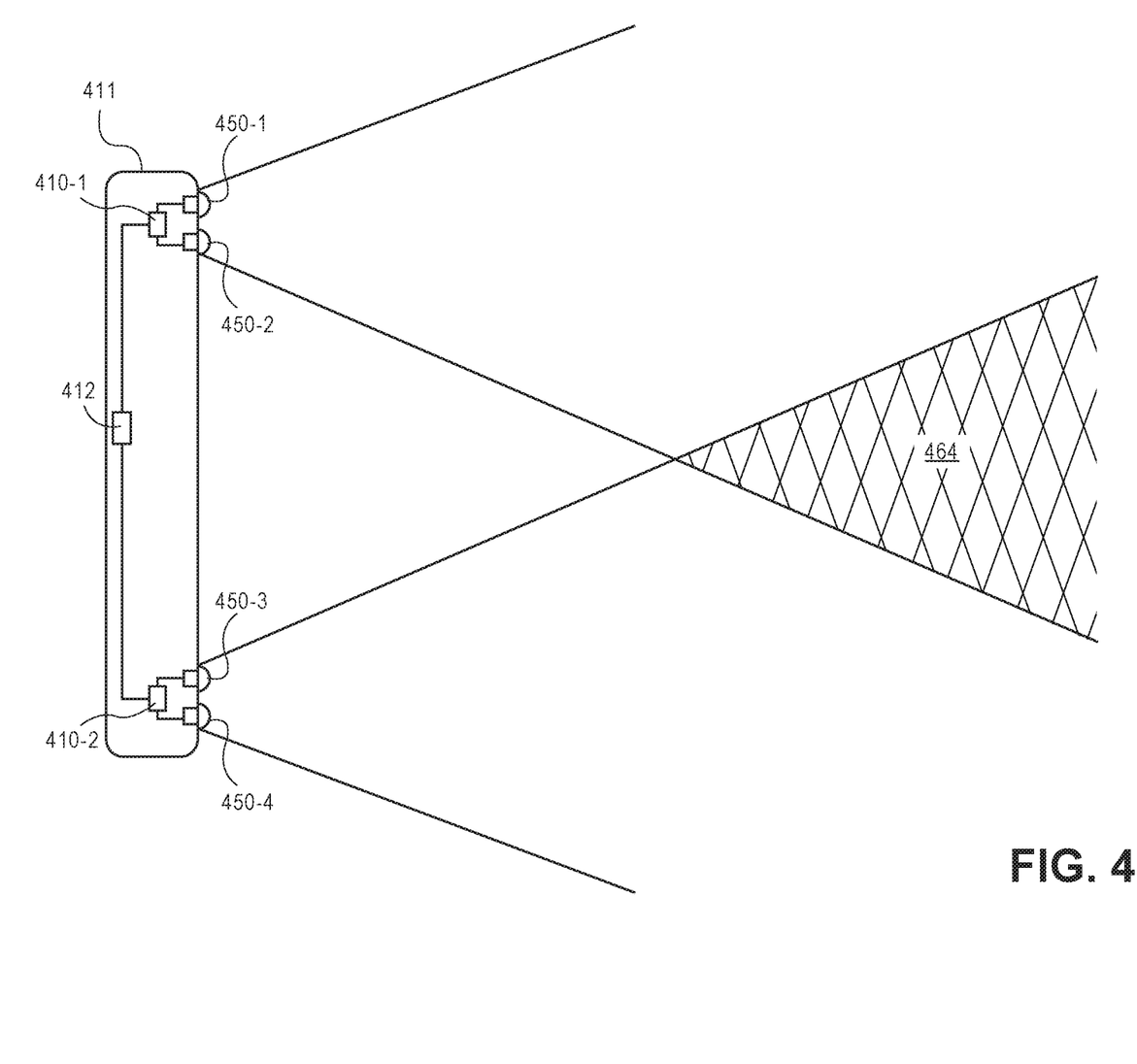
FIG. 4 depicts another view of a plurality of selectable imaging elements of an aerial vehicle, according to an implementation.

FIG. 4 depicts another view of a plurality of selectable cameras of an aerial vehicle, according to an implementation. In this example, two pairs of stereo cameras are coupled to a portion 411 of an aerial vehicle. In a first mode of operation, the first stereo camera arrangement, which includes imaging elements 450-1 and 450-2 provide images to stereo controller 410-1 that processes the images. Likewise, the second stereo camera arrangement, which includes imaging elements 450-3 and 450-4 provides images to stereo controller 410-2 that processes the images. The images processed from the two pairs of stereo cameras may be analyzed to determine if an object is detected. For example, a change in pixel values, or depth information may be indicative of a presence of an object. Alternatively, or in addition thereto, one or more image processing algorithms may be utilized to detect objects represented in the images.

If an object is detected at a farther distance from the aerial vehicle, the imaging element selection controller 412 may use an imaging element from each of the stereo pairs, such as imaging element 450-2 and imaging element 450-3 to dynamically generate a third stereo pair of imaging elements that may be used to generate imaging information for the object. For example, if the object is in the common field of view 464 of imaging element 450-2 and imaging element 450-3, the imaging element selection controller 412 may obtain images from those imaging elements 450-2, 450-3 and process those images to generate depth information for objects in that common field of view 464.

While FIGS. 2A-4 illustrate different configurations of a plurality of imaging elements that may be selectively paired by an imaging element selection controller to generate depth information based on different baseline distances, it will be appreciated that any number, combination, and/or spacing of imaging elements may be utilized with the implementations discussed herein. Likewise, while the discussions describe pairing two imaging elements, in some implementations, the imagining element selection controller may combine images from more than two imaging elements. Likewise, any number of imaging elements may be activated to obtain images at approximately the same time. The imaging element selection controller may then process different combinations of those images to generate different sets of depth information for an object represented on those images. The different sets of depth information may then be combined to provide increased resolution for the depth information. For example, if three imaging elements are activated, such as imaging elements 350-2, 350-3, 350-4 and 350-6, and each of those imaging elements generate an image at approximately the same time, the imaging element selection controller may generate six different sets of depth information, each set based on a different combination and baseline of imaging elements. Specifically, the imaging element selection controller may generate a first set of depth information based on images generated by imaging elements 350-2 and 350-3, a second set of depth information based on images generated by imaging elements 350-2 and 350-4, a third set of depth information based on images generated by imaging elements 350-2 and 350-6, a fourth set of depth information based on images generated by imaging elements 350-3 and 350-4, a fifth set of depth information based on images generated by imaging elements 350-3 and 350-6, and a sixth set of depth information based on images generated by imaging elements 350-4 and 350-6.

Those sets of depth information may then be combined to provide a higher resolution of depth information. Alternatively, or in addition thereto, the different sets of depth information may be compared to select a combination of imaging elements for continued image generation for monitoring the position of the object with respect to the UAV.

Figure 5:
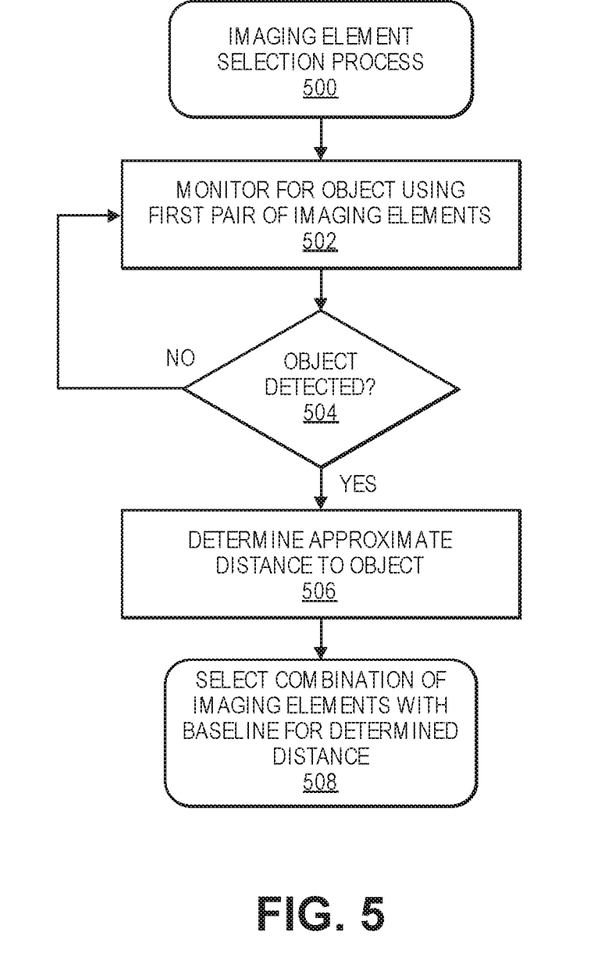
FIG. 5 is a flow diagram illustrating an example process for imaging element selection, according to an implementation.

FIG. 5 is a flow diagram illustrating an example process for imaging element selection, according to an implementation. The process of FIG. 5 and each of the other processes and sub-processes discussed herein may be implemented in hardware, software, or a combination thereof. In the context of software, the described operations represent computer-executable instructions stored on one or more computer-readable media that, when executed by the one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 500 begins by monitoring for an object using a first stereo pair of imaging elements, as in 502. For example, the process may utilize a pair of imaging elements having a smallest baseline and/or a largest common field of view for initial detection of objects. Alternatively, there may be a primary or preferred distance that is to be monitored and a pair of imaging elements selected that provide the highest resolution for objects detected at that primary or preferred distance. As discussed above, images maybe obtained using the pair of imaging elements and processed to detect objects represented in the combined images.

In addition, or as an alternative to using images from a first pair of imaging elements to detect an object, a distance determining element, such as a range finder, time-of-flight sensor, SONAR, LIDAR, and/or other like component, may be used to detect a presence of an object within a distance of an aerial vehicle. As still another example, rather than using images from a pair of cameras, images from a single camera may be obtained and processed to determine a presence of a potential object. For example, pixel values may be compared between images to detect changes in the field of view that may be representative of an object. If a potential object is detected, additional processing, using, for example, a pair of imaging elements and/or a distance determining element, as discussed above, may be utilized to determine a presence of an object.

Based on the monitoring, a determination is made as to whether an object has been detected, as in 504. If it is determined that an object has not been detected, the example process 500 returns to block 502 and continues. If it is determined that an object has been detected, an approximate distance between the object and the aerial vehicle is determined, as in 506. For example, the stereo imaging information and the known baseline may be utilized to determine an approximate distance between the object and the aerial vehicle. Likewise, the distance determined by a distance determining element may be utilized as the approximate distance.

Based on the determined approximate distance, a combination of imaging elements is selected for use in obtaining images of the object that are used to generate depth information about the object. The selection may be made based at least in part on the determined approximate distance and the baselines of the available combinations of imaging elements. For example, a ratio, such as a 1:30 ratio may be utilized and a combination of imaging elements selected that is closest to the ratio based on the determined approximate distance between the object and the aerial vehicle. Alternatively, multiple combinations of imaging elements may be selected and disparity information generated. The combination of imaging elements with the greatest disparity information may be selected to monitor the object. Other techniques may likewise by utilized to select a combination of imaging elements.

The example process 500 may continue as the distance between the object and the aerial vehicle alters and/or during any operation of the aerial vehicle. For example, if the distance between the aerial vehicle and the object changes (increases or decreases) the selected combination of imaging elements may be changed with each completion of the example process 500. For example, if the distance between the aerial vehicle and the object increases, one or more of the imaging elements may be changed such that the baseline distance between the selected combination of imaging elements corresponds with a ratio and/or other criteria of the example process 500, based on the updated distance between the object and the aerial vehicle.

While the examples discussed herein describe use of the implementations with an aerial vehicle, such as an unmanned aerial vehicle, it will be appreciated that the described implementations may likewise be used with other vehicles and/or in other scenarios. For example, a plurality of imaging elements may be positioned on another type of vehicle, such as a ground based and/or water based vehicle and an imaging element selection controller utilized to select a combination of imaging elements, as discussed above.

Figure 6:
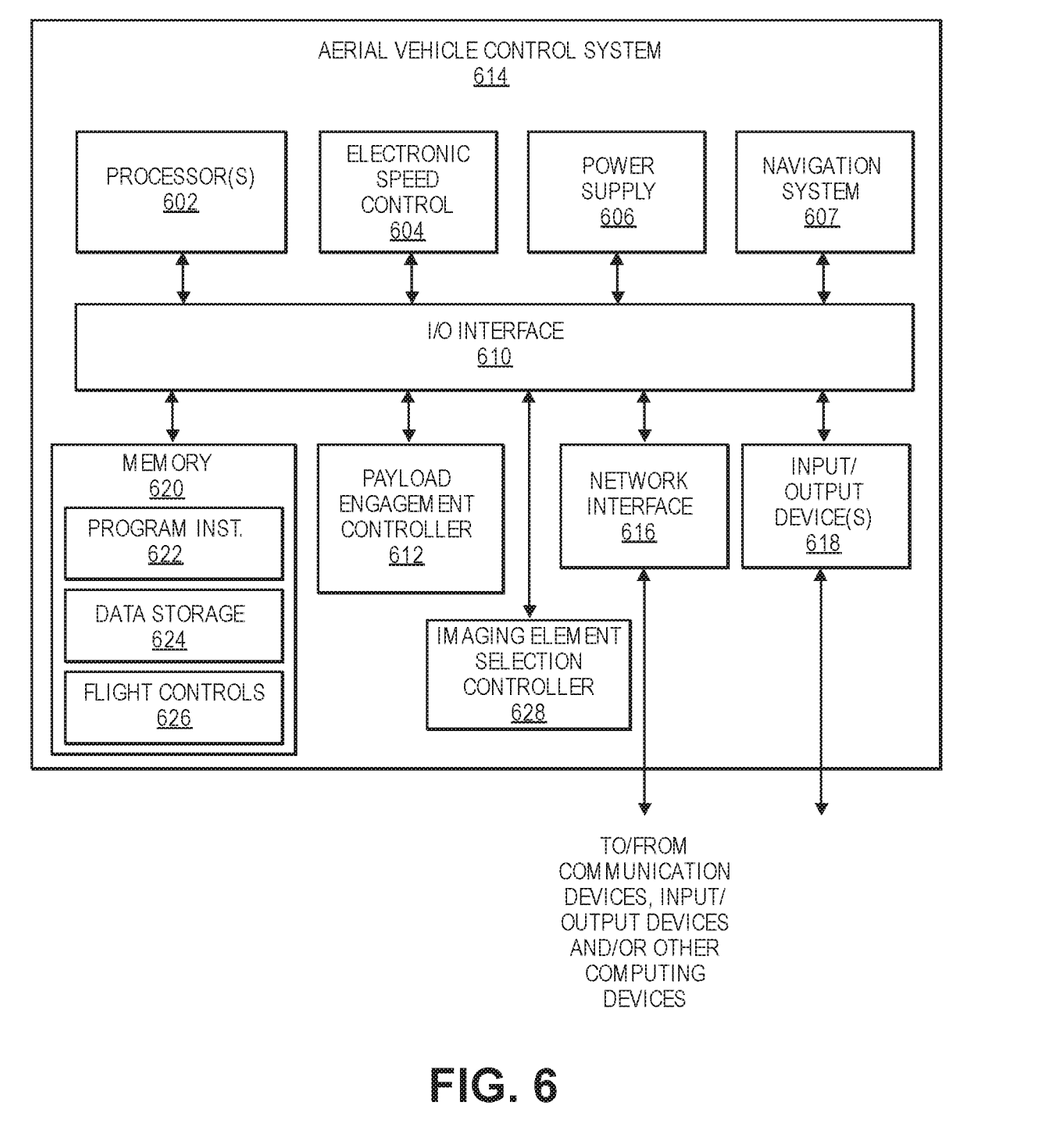
FIG. 6 is a block diagram of an illustrative implementation of an unmanned aerial vehicle control system that may be used with various implementations.

FIG. 6 is a block diagram illustrating an example aerial vehicle control system 614. In various examples, the block diagram may be illustrative of one or more aspects of the aerial vehicle control system 114 that may be used to implement the various systems and methods discussed herein and/or to control operation of the aerial vehicles described herein. In the illustrated implementation, the aerial vehicle control system 614 includes one or more processors 602, coupled to a memory, e.g., a non-transitory computer readable storage medium 620, via an input/output (I/O) interface 610. The aerial vehicle control system 614 may also include electronic speed controls 604 (ESCs), power supply modules 606, a navigation system 607, and/or a payload engagement controller 612. In some implementations, the navigation system 607 may include an inertial measurement unit (IMU). The aerial vehicle control system 614 may also include a network interface 616, and one or more input/output devices 618.

In various implementations, the aerial vehicle control system 614 may be a uniprocessor system including one processor 602, or a multiprocessor system including several processors 602 (e.g., two, four, eight, or another suitable number). The processor(s) 602 may be any suitable processor capable of executing instructions. For example, in various implementations, the processor(s) 602 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 602 may commonly, but not necessarily, implement the same ISA.

The non-transitory computer readable storage medium 620 may be configured to store executable instructions, data, flight paths, flight control parameters, and/or data items accessible by the processor(s) 602. Data items may include, for example, images obtained from one or more of the imaging elements, distance information, combined image information (e.g., depth information), etc.

In various implementations, the non-transitory computer readable storage medium 620 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 620 as program instructions 622, data storage 624 and flight controls 626, respectively. In other implementations, program instructions, data, and/or flight controls may be received, sent, or stored upon different types of computer-accessible media, such as non-transitory media, or on similar media separate from the non-transitory computer readable storage medium 620 or the aerial vehicle control system 614. Generally speaking, a non-transitory, computer readable storage medium may include storage media or memory media such as magnetic or optical media, e.g., disk or CD/DVD-ROM, coupled to the aerial vehicle control system 614 via the I/O interface 610. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 616.

In one implementation, the I/O interface 610 may be configured to coordinate I/O traffic between the processor(s) 602, the non-transitory computer readable storage medium 620, and any peripheral devices, the network interface 616 or other peripheral interfaces, such as input/output devices 618. In some implementations, the I/O interface 610 may perform any necessary protocol, timing or other data transformations to convert data signals from one component (e.g., non-transitory computer readable storage medium 620) into a format suitable for use by another component (e.g., processor(s) 602). In some implementations, the I/O interface 610 may include support for devices attached through various types of peripheral buses, such as a variant of the Peripheral Component Interconnect (PCI) bus standard or the Universal Serial Bus (USB) standard, for example. In some implementations, the function of the I/O interface 610 may be split into two or more separate components, such as a north bridge and a south bridge, for example. Also, in some implementations, some or all of the functionality of the I/O interface 610, such as an interface to the non-transitory computer readable storage medium 620, may be incorporated directly into the processor(s) 602.

The ESCs 604 communicate with the navigation system 607 and adjust the rotational speed of each lifting motor and/or the thrusting motor to stabilize the UAV and guide the UAV along a determined flight path. The navigation system 607 may include a GPS, indoor positioning system (IPS), IMU or other similar systems and/or sensors that can be used to navigate the UAV 100 to and/or from a location. The payload engagement controller 612 communicates with actuator(s) or motor(s) (e.g., a servo motor) used to engage and/or disengage items.

The network interface 616 may be configured to allow data to be exchanged between the aerial vehicle control system 614, other devices attached to a network, such as other computer systems (e.g., remote computing resources), and/or with aerial vehicle control systems of other UAVs. For example, the network interface 616 may enable wireless communication between the UAV that includes the control system 614 and an aerial vehicle control system that is implemented on one or more remote computing resources. For wireless communication, an antenna of an UAV or other communication components may be utilized. As another example, the network interface 616 may enable wireless communication between numerous UAVs. In various implementations, the network interface 616 may support communication via wireless general data networks, such as a Wi-Fi network. For example, the network interface 616 may support communication via telecommunications networks, such as cellular communication networks, satellite networks, and the like.

Input/output devices 618 may, in some implementations, include one or more displays, imaging devices, thermal sensors, infrared sensors, time of flight sensors, accelerometers, pressure sensors, weather sensors, imaging elements (e.g., cameras), gimbals, landing gear, etc. Multiple input/output devices 618 may be present and controlled by the aerial vehicle control system 614. One or more of these sensors may be utilized to assist in landing as well as to avoid obstacles during flight.

As shown in FIG. 6, the memory may include program instructions 622, which may be configured to implement the example routines and/or sub-routines described herein. The data storage 624 may include various data stores for maintaining data items that may be provided for determining flight paths, landing, identifying locations for disengaging items, engaging/disengaging the thrusting motors, selecting a combination of imaging elements for stereo imaging, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

The aerial vehicle control system 614 may also include the imaging element selection controller 628. As discussed above, the imaging element selection controller communicates with the plurality of imaging elements and selects combinations of imaging elements for use as a stereo pair for generating depth information about an object represented in images obtained by the selected imaging elements. In some implementations, the imaging element selection controller 628 also communicates with a distance determining element to determine an approximate distance between the aerial vehicle and a detected object. As discussed above, the approximate distance may be utilized to select a combination of imaging elements based on, for examples, a ratio between the approximate distance and baselines distances between different combinations of imaging elements.

Those skilled in the art will appreciate that the aerial vehicle control system 614 is merely illustrative and is not intended to limit the scope of the present disclosure. In particular, the computing system and devices may include any combination of hardware or software that can perform the indicated functions. The aerial vehicle control system 614 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system 614. Some or all of the system components or data structures may also be stored (e.g., as instructions or structured data) on a non-transitory, computer-accessible medium or a portable article to be read by an appropriate drive. In some implementations, instructions stored on a computer-accessible medium separate from the aerial vehicle control system 614 may be transmitted to the aerial vehicle control system 614 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other aerial vehicle control system configurations.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An aerial vehicle apparatus, comprising:
a frame;
a plurality of cameras coupled to the frame;
a camera selection controller in communication with each of the plurality of cameras, the camera selection controller configured to at least:
during aerial navigation of the aerial vehicle apparatus:
detect an object;
determine a first approximate distance between the aerial vehicle apparatus and the object;
select a first camera and a second camera from the plurality of cameras as a first combination of cameras, wherein the selection is based at least in part on the first approximate distance and a first baseline distance between the first camera and the second camera;
receive a first image from the first camera;
receive a second image from the second camera;
process the first image and the second image to generate first depth information corresponding to the object;
subsequent to generation of the first depth information, determine a second approximate distance between the aerial vehicle apparatus and the object;
determine that the second approximate distance is different than the first approximate distance;
in response to a determination that the second approximate distance is different than the first approximate distance, select a third camera and a fourth camera of the plurality of cameras as a second combination of cameras, wherein the selection is based at least in part on the second approximate distance and a second baseline distance between the second camera and the third camera;
receive a third image from the third camera;
receive a fourth image from the fourth camera; and
process the third image and the fourth image to generate second depth information corresponding to the object.

2. The aerial vehicle apparatus of claim 1, wherein the camera selection controller is further configured to at least determine the second approximate distance based at least in part on the first depth information.

3. The aerial vehicle apparatus of claim 1, further comprising:
a distance determining element coupled to the frame of the aerial vehicle apparatus and configured to at least determine at least one of the first approximate distance or the second approximate distance.

4. The aerial vehicle apparatus of claim 1, wherein a first alignment of the first baseline distance is different than a second alignment of the second baseline distance.

5. The aerial vehicle apparatus of claim 1, wherein the camera selection controller is further configured to at least:
select the first camera of the plurality of cameras and the fourth camera of the plurality of cameras as a third combination of cameras;
receive a fifth image from the first camera;
receive a sixth image from the fourth camera; and
process the fifth image and the sixth image to generate third depth information, wherein the third depth information includes information corresponding to the object.

6. The aerial vehicle apparatus of claim 1, wherein the plurality of cameras coupled to the frame are spaced such that each potential pair of cameras of the plurality of cameras have a different baseline distance.

7. An aerial vehicle apparatus, comprising:
a propulsion mechanism;
a plurality of imaging elements spaced about the aerial vehicle apparatus;
an imaging element selection controller in communication with each of the plurality of imaging elements, the imaging element selection controller configured to at least:
during aerial navigation of the aerial vehicle apparatus:
detect an object;
determine a first approximate distance between the aerial vehicle apparatus and the object;
select a first combination of imaging elements of the plurality of imaging elements, wherein the selection is based at least in part on the first approximate distance and a first baseline distance between the imaging elements of the first combination of imaging elements;
obtain, from each imaging element of the first combination of imaging elements, a first image;
process the first image received from each imaging element of the first combination of imaging elements to generate first depth information corresponding to the object;
subsequent to generation of the first depth information, determine a second approximate distance between the aerial vehicle apparatus and the object;
determine that the second approximate distance is different than the first approximate distance;
in response to a determination that the second approximate distance is different than the first approximate distance, select a second combination of imaging elements of the plurality of imaging elements, wherein the selection is based at least in part on the second approximate distance and a second baseline distance between the imaging elements of the second combination of imaging elements;
obtain, from each imaging element of the second combination of imaging elements, a second image; and
process the second image received from each imaging element of the second combination of imaging elements to generate second depth information corresponding to the object.

8. The aerial vehicle apparatus of claim 7, wherein at least three of the plurality of imaging elements are spaced about the aerial vehicle apparatus such that a baseline distance between each of the at least three imaging elements of the plurality of imaging elements is different.

9. The aerial vehicle apparatus of claim 7, wherein:
the first approximate distance is greater than the second approximate distance; and
the first baseline distance is larger than the second baseline distance.

10. The aerial vehicle apparatus of claim 7, wherein:
a first alignment of the first baseline distance between each imaging element of the first combination of imaging elements is different than a second alignment of the second baseline distance between each imaging element of the second combination of imaging elements.

11. The aerial vehicle apparatus of claim 7, wherein a position of the object is within a common field of view of each imaging element of the first combination of imaging elements.

12. The aerial vehicle apparatus of claim 7, wherein at least a portion of a field of view of each of the plurality of imaging elements overlap.

13. The aerial vehicle apparatus of claim 7, wherein:
images are periodically generated by each of the plurality of imaging elements; and
the imaging element selection controller obtains a first image from a data store of the aerial vehicle apparatus in response to selecting a first imaging element as an imaging element of the first combination of imaging elements.

14. The aerial vehicle apparatus of claim 7, wherein the imaging element selection controller is further configured to at least:
generate, based at least in part on the first image received from each imaging element of the first combination of imaging elements, first disparity information;
select a third combination of imaging elements, wherein the selection is based at least in part on the first approximate distance and a third baseline distance between the imaging elements of the third combination of imaging elements;
obtain, from each imaging element of the third combination of imaging elements, a third image;
generate, based at least in part on the third image received from each imaging element of the third combination of imaging elements, second disparity information; and
determine to process the first image received from each imaging element of the first combination of imaging elements to generate first depth information corresponding to the object based at least in part on a determination that a first disparity of the first disparity information is greater than a second disparity of the second disparity information.

15. The aerial vehicle apparatus of claim 7, wherein the imaging element selection controller is further configured to at least select the first combination based at least in part on a ratio between the first approximate distance and the first baseline distance.

16. The aerial vehicle apparatus of claim 7, wherein the frame includes a wing, a winglet and a side rail, and at least one of the first camera, the second camera, the third camera, or the fourth camera is coupled to the wing, the winglet, or the side rail.

17. A method, comprising:
during aerial navigation of an aerial vehicle:
detecting an object;
determining a first approximate distance between the object and the aerial vehicle;
selecting from a plurality of imaging elements of the aerial vehicle, a first combination of imaging elements, wherein the first combination of imaging elements are selected based at least in part on the first approximate distance and a first baseline distance between imaging elements of the first combination of imaging elements;
receiving, from each imaging element of the first combination of imaging elements, a first image;
processing the first image received from each imaging element of the first combination of imaging elements to generate first depth information, wherein the first depth information includes depth information corresponding to the object;
subsequent to generation of the first depth information, determining a second approximate distance between the aerial vehicle and the object;
determining that the second approximate distance is different than the first approximate distance;
in response to determining that the second approximate distance is different than the first approximate distance, selecting a second combination of imaging elements of the plurality of imaging elements, wherein the selection is based at least in part on the second approximate distance and a second baseline distance between the imaging elements of the second combination of imaging elements;
obtaining, from each imaging element of the second combination of imaging elements, a second image; and
processing the second image received from each imaging element of the second combination of imaging elements to generate second depth information, wherein the second depth information includes depth information corresponding to the object.

18. The method of claim 17, wherein:
the first approximate distance is greater than the second approximate distance; and
the first baseline distance is greater than the second baseline distance.

19. The method of claim 17, further comprising:
subsequent to generating the second depth information, determining a third approximate distance between the object and the aerial vehicle;
determining that the third approximate distance is different than the second approximate distance;
in response to determining the third approximate distance is different than the second approximate distance, selecting from the plurality of imaging elements of the aerial vehicle a third combination of imaging elements, wherein the third combination of imaging elements is selected based at least in part on the third approximate distance and a third baseline distance between imaging elements of the third combination of imaging elements;
receiving, from each imaging element of the third combination of imaging elements, a third image; and
processing the third image received from each imaging element of the third combination of imaging elements to generate third depth information, wherein the third depth information includes third depth information corresponding to the object.

20. The method of claim 19, wherein:
the second approximate distance is greater than the third approximate distance; and
the second baseline distance is greater than the third baseline distance.

21. The method of claim 19, wherein the first baseline distance is different than the second baseline distance, the first baseline distance is different than the third baseline distance, and the second baseline distance is different than the third baseline distance.

22. The method of claim 17, further comprising:
subsequent to processing the second image received from each imaging element of the second combination of imaging elements, determining that an imaging element of the second combination of imaging elements in inoperable;
in response to determining that the imaging element is inoperable, selecting a third combination of imaging elements of the plurality of imaging elements, wherein the third combination does not include the imaging element;
obtaining, from each imaging element of the third combination of imaging elements, a third image; and
processing the third image received from each imaging element of the third combination of imaging elements to generate third depth information, wherein the third depth information includes depth information corresponding to the object.

* * * * *